US009745399B2

(12) United States Patent
Magnet et al.

(10) Patent No.: US 9,745,399 B2
(45) Date of Patent: *Aug. 29, 2017

(54) FILAMENTOUS POLYMER PARTICLES AND METHOD FOR PREPARING SAME BY MEANS OF CONTROLLED RADICAL POLYMERISATION IN EMULSION

(75) Inventors: Stephanie Magnet, Morlanne (FR); Raber Inoubli, Pau (FR); Laurence Couvreur, Paris (FR); Bernadette Charleux, Lyons (FR); Segolene Brusseau, Cachan (FR)

(73) Assignees: ARKEMA FRANCE, Colombes (FR); CENTRE NATIONAL DE LA RECHERCHE SCIENTIFIQUE, Paris (FR); UNIVERSITE PIERRE ET MARIE CURIE, Paris (FR)

( * ) Notice: Subject to any disclaimer, the term of this patent is extended or adjusted under 35 U.S.C. 154(b) by 237 days.

This patent is subject to a terminal disclaimer.

(21) Appl. No.: 13/996,703

(22) PCT Filed: Dec. 16, 2011

(86) PCT No.: PCT/FR2011/053029
§ 371 (c)(1),
(2), (4) Date: Aug. 6, 2013

(87) PCT Pub. No.: WO2012/085415
PCT Pub. Date: Jun. 28, 2012

(65) Prior Publication Data
US 2013/0338315 A1 Dec. 19, 2013

(30) Foreign Application Priority Data
Dec. 23, 2010 (FR) .................................... 10 61152

(51) Int. Cl.
*D01F 6/28* (2006.01)
*C08F 293/00* (2006.01)
(Continued)

(52) U.S. Cl.
CPC .............. *C08F 293/00* (2013.01); *C08F 2/22* (2013.01); *C08F 2/38* (2013.01); *C08F 293/005* (2013.01); *D01F 6/28* (2013.01)

(58) Field of Classification Search
CPC ............ D01F 6/28; C08F 293/00; C08F 2/22
See application file for complete search history.

(56) References Cited

U.S. PATENT DOCUMENTS 4,563,290 A 1/1986 Okada et al.
4,584,358 A 4/1986 McCormick et al.
(Continued)

FOREIGN PATENT DOCUMENTS

FR 2911877 A1 * 8/2008 ................ C08F 2/38
WO WO 2009150367 A2 * 12/2009

OTHER PUBLICATIONS

Delaittre et al. Softer Matter 2006 Abstract.*
(Continued)

*Primary Examiner* — Mark Kaucher
(74) *Attorney, Agent, or Firm* — Thomas F. Roland

(57) ABSTRACT

The invention relates to polymer particles in the form of filaments formed by block copolymers, as well as to the method for preparing same by means of controlled radical polymerization in emulsion in the presence of a specific living macroinitiator derived from a nitroxide. The invention is characterized in that the filamentous particles are obtained in a dispersed aqueous medium by means of the synthesis of said block copolymers, performed by heating the reaction medium at a temperature of 60 to 120° C., the final block copolymer containing between 10 and 50 mol. % of the (Continued)

macroinitiator which is water soluble and the hydrophobic monomer conversion rate being at least 50%. According to the invention, the weight ratio of hydrophilic fraction of the filamentous particles is less than 25 wt %.

8 Claims, 5 Drawing Sheets

(51) Int. Cl.
   *C08F 2/22* (2006.01)
   *C08F 2/38* (2006.01)

(56) References Cited

U.S. PATENT DOCUMENTS

| | | |
|---|---|---|
| 2008/0045420 A1 | 2/2008 | Karagianni et al. |
| 2010/0137534 A1* | 6/2010 | Magnet et al. ............... 526/193 |
| 2011/0166282 A1 | 7/2011 | Dire et al. |

OTHER PUBLICATIONS

Delaittre, G et al "Aqueous Suspension of Amphiphilic Diblock Copolymer Nanoparticles Prepared in situ from a Water-soluble poly(sodium acrylate) alkoxyamine macroinitiator" Soft Matter R Soc ChemUK vol. 2, No. 3, Mar. 7, 2006 p. 223-231.

* cited by examiner

FILAMENTOUS POLYMER PARTICLES AND METHOD FOR PREPARING SAME BY MEANS OF CONTROLLED RADICAL POLYMERISATION IN EMULSION

This application claims benefit, under U.S.C. §119 or §365 of PCT Application Number PCT/FR2011/053029, filed Dec. 16, 2011, and French Patent Application Number FR 10.61152, filed Dec. 23, 2010.

FIELD OF THE INVENTION

The present invention pertains to polymer particles in filament form that are composed of block copolymers, and to a method for preparing them by controlled radical emulsion polymerization in the presence of a specific living macroinitiator.

BACKGROUND OF THE INVENTION

Filamentous polymeric aggregates, also known as "vermiform micelles" or "cylindrical micelles" or else "filomicelles", have been studied in recent years for their increasing attractiveness especially in biomedical applications as systems for administering drugs. These polymeric aggregates are prepared by the assembly of copolymers with amphiphilic blocks in a selective solvent; these techniques necessitate the use of organic cosolvents, comprise a large number of steps, and give rise to problems of reproducibility.

Alternative preparation pathways have been proposed, as for example in the publication by G. Delaittre et al. *Chem. Commun.* 2009, 2887-2889, which describes the preparation of vesicles of amphiphilic-block PNaA-b-P4VP copolymers. These polymers are obtained in aqueous medium at a pH of 11 in a single step by emulsion CRP; the polymerization reaction of the 4VP is initiated using a water-soluble sodium polyacrylate macroalkoxyamine SG1. The resulting copolymers undergo self-assembly to form aggregates, with chain extension taking place on the part of the hydrophobic chains. Observations under a transmission electron microscope (TEM) have shown that the polymer particles formed have sizes of less than a micrometer and that their shapes are variable, ranging from spherical particles (60 nm) to vermiform micelles (60 nm in width), and on to spherical vesicles and elongated vesicles or multiple-compartment vesicles, as shown in FIG. 3 of this document. The length of these particles, however, remains low, with only some of the micelles having a length of greater than 1 micron.

Another pathway has been described by S. Boissé et al. in *Chem. Commun.* 2010, 46, 1950-1952. This document sets out the preparation of nanofibers composed of amphiphilic block copolymers by reversible addition fragmentation transfer (RAFT) radical polymerization. Styrene is polymerized in water in the presence of a macromolecular RAFT agent (or RAFT macro agent) which is hydrophilic. When the homopolymer of acrylic acid (AA) or of poly(ethylene glycol) methyl ether acrylate (PEGA) is employed as RAFT macro agent, the block copolymers obtained take the form of spherical micelles (as shown in FIG. 1 of the article cited, (1) and (9) respectively). Only the use of copolymer RAFT macro agents composed of AA and PEGA has allowed the preparation of vermiform micelles in a mixture with vesicles (as shown in FIG. 1 of the article cited, (2), (3) and (8)). The formation of particles in the form of fibers is favored, as shown in FIG. 2 of the article cited, when the pH is low or when the pH is high and, in parallel, the ionic strength is high. Lastly, the results presented in FIG. 3 of this document show that the greater the increase in degree of conversion, the greater the extent to which the morphology of the particles changes from spherical forms toward fibrillar forms.

Polymerization by means of RAFT agents, however, is limited, since it necessitates the use of an additional radical initiator throughout the polymerization, which may be detrimental to the formation of block copolymers.

SUMMARY OF THE INVENTION

The proposal of the present invention is to overcome the drawbacks in the techniques of the prior art set out above. The object of the present invention is the preparation of filamentous particles by controlled radical emulsion polymerization of hydrophobic monomers, using as initiators living, nitroxide-derived macroinitiators. A further object of the invention is a direct technique for preparing filamentous particles that does not necessitate the use of organic cosolvent.

To this effect, and according to a first object, the present invention relates to a method for preparing filamentous particles, said particles being composed of block copolymers synthesized by controlled radical emulsion polymerization from at least one hydrophobic monomer in the presence of a living macroinitiator derived from a nitroxide, characterized in that:

said filamentous particles are obtained in aqueous medium directly during the synthesis of said block copolymers, performed by heating the reaction mixture at a temperature of 60 to 120° C., said macroinitiator is water-soluble, the percentage of the molar mass of the water-soluble macroinitiator in the final block copolymer is between 10% and 50%, and in that the degree of conversion of the hydrophobic monomer is at least 50%.

In the context of the present invention, the term "filamentous particles" corresponds to assemblies of amphiphilic macromolecules which, when in suspension in water (in other words, when they form an aqueous dispersion), take the form of filaments (in other words, flexible, solid cylinders) with a core composed of the hydrophobic elements and a surface composed of the hydrophilic elements of said macromolecules. These filamentous particles can be observed under a transmission electron microscope (TEM). The length of these filaments is at least 10 micrometers.

In contradistinction to the filamentous particles, the spherical particles (or micelles) in suspension in water are assemblies of amphiphilic molecules which take the form of a solid sphere with a core composed of the hydrophobic elements of the molecules, and a surface composed of the hydrophilic elements.

In document WO 2009150367 the applicant had already described the preparation of polymer particles from at least one hydrophobic methacrylate monomer and another hydrophobic monomer in the presence of a living nitroxide microinitiator derived from SG1. The polymer particles thus obtained take the form of spherical micelles, irrespective of the degree of conversion. They are characterized in comparative example 2 of the present invention and also in appended FIG. 1.

Surprisingly, it has now been found that in the presence of a water-soluble macroinitiator, and with selection of a specific ratio between the molar masses of the water-soluble macroinitiator and of the second, hydrophobic block, filamentous particles are obtained. These filamentous particles are advantageously not in thermodynamic equilibrium (they are said to be in a frozen state), in contrast to the wormlike micelles described above, which, under the effect of the dilution, enter the state of spherical micelles, which is a more thermodynamically stable state. This nonequilibrium thermodynamic state is independent of the glass transition value of the polymer, but is partly dependent on the length of the hydrophobic block. The form and structure of the filamentous particles according to the invention are maintained in dispersed medium, independently of their concentration in the medium, of the dialysis of the particles (FIG. 6), of the centrifuging of the medium (FIG. 7), and of variations in its pH (FIG. 8) or its salinity (FIG. 9).

BRIEF DESCRIPTION OF THE DRAWINGS

The invention and the advantages it provides will be appreciated more fully in the light of the detailed description which follows, and of the appended figures, in which.

DETAILED DESCRIPTION OF THE INVENTION

Figure 1:
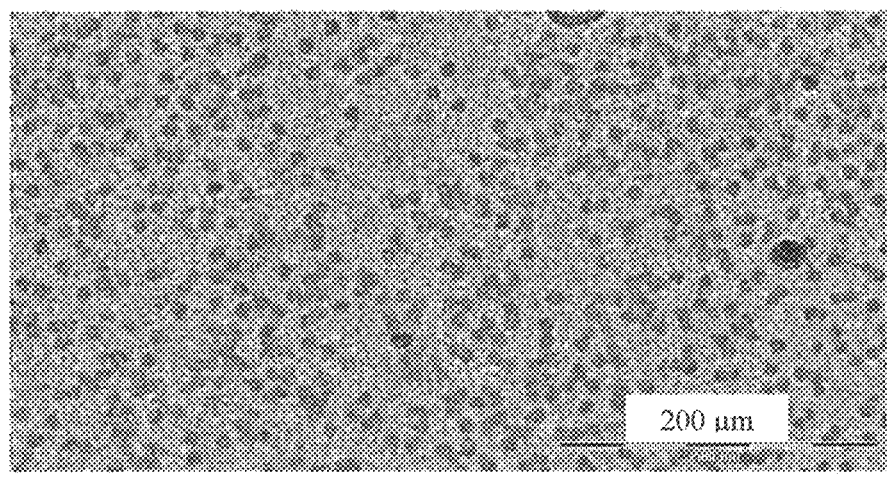
FIG. 1 is the image obtained by TEM for the spherical particles of comparative example 2, corresponding to the invention described in document WO 2009150367; the degree of conversion by mass is 67.2%, and the mass fraction of the hydrophilic moiety constituting the block copolymer (or "proportion of hydrophilic fraction") is 23.4% by weight.

The research conducted by the applicant was directed at the development of a technique allowing preparation of filamentous particles which are stable in aqueous dispersion.

To this effect, the invention, according to a first aspect, provides a method for preparing filamentous polymer particles, said particles being composed of block copolymers synthesized by controlled radical emulsion polymerization performed from at least one hydrophobic monomer in the presence of a living macroinitiator derived from a nitroxide.

Said filamentous particles are characteristically obtained in dispersed aqueous medium by synthesis of said block copolymers performed in situ by heating the reaction mixture at a temperature of 60 to 120° C., said macroinitiator being water-soluble, with a percentage of the molar mass of the water-soluble macroinitiator in the final block copolymer of between 10% and 50%, the degree of conversion of the hydrophobic monomer being at least 50%. The initial pH of the aqueous medium may vary between 5 and 10. This direct technique for preparing filamentous particles does not require the use of organic cosolvent.

A "living macroinitiator" is a polymer comprising at least one end suitable for re-engagement in a polymerization reaction by addition of monomers at appropriate temperature and appropriate pressure. Said macroinitiator is advantageously prepared by CRP. A "water-soluble macroinitiator" is a polymer which is soluble in water and comprises at its end a reactive function capable of reinitiating a radical polymerization. This macroinitiator is composed principally of hydrophilic monomers, these being monomers having one or more functions capable of establishing hydrogen bonds with water. In the case of the polymerization of a hydrophobic monomer, an amphiphilic copolymer will be formed, with the hydrophilic block composed of macroinitiator, while the hydrophobic block will be obtained from the polymerization of the hydrophobic monomer or monomers.

According to one variant embodiment, said preformed water-soluble macroinitiator is added to the reaction mixture comprising at least one hydrophobic monomer.

According to another variant embodiment, said water-soluble macroinitiator is synthesized in the aqueous reaction mixture in a preliminary step, without isolation of the macroinitiator formed and without removal of any residual hydrophilic monomers. This second variant is a "one-pot" polymerization.

The hydrophobic monomers may be selected from the following:
  vinylaromatic monomers such as styrene or substituted styrenes,
  alkyl, cycloalkyl, or aryl acrylates, such as methyl, ethyl, butyl, 2-ethylhexyl, or phenyl acrylate,
  alkyl, cycloalkyl, alkenyl, or aryl methacrylates such as methyl, butyl, lauryl, cyclohexyl, allyl, 2-ethylhexyl, or phenyl methacrylate,
  and vinylpyridine.

These hydrophobic monomers are added to the reaction mixture which principally comprises water.

The percentage of the molar mass of the water-soluble macroinitiator in the final block copolymer is preferably between 10% and 30%.

Implementation of the method according to the invention produces filamentous polymer particles in which the mass fraction of the hydrophilic moiety constituting the block copolymer is less than 25%.

According to one embodiment, when the reaction medium is admixed with a crosslinking agent, crosslinked filamentous particles are obtained. Said crosslinking agent is a crosslinking comonomer other than the aforementioned hydrophobic monomers.

A crosslinking comonomer is a monomer which, by virtue of its reactivity with the other monomers present in the polymerization medium, is capable of generating a covalent three-dimensional network. From a chemical viewpoint, a crosslinking comonomer generally comprises at least two polymerizable ethylenic functions which, by reacting, are capable of producing bridges between a number of polymer chains.

These crosslinking comonomers may be capable of reacting with the unsaturated hydrophobic monomers during the synthesis of said particles.

The crosslinking comonomers include divinylbenzenes, trivinylbenzenes, allyl(meth)acrylates, diallylmaleate polyol (meth)acrylates such as trimethylolpropane tri(meth)acrylates, alkylene glycol di(meth)acrylates which have from 2 to 10 carbon atoms in the carbon chain, such as ethylene glycol di(meth)acrylates, 1,4-butanediol di(meth)acrylates, and 1,6-hexanediol di(meth)acrylates, and N,N'-alkylenebisacrylamides, such as N,N'-methylenebisacrylamide. Preference will be given to using divinylbenzene or a dimethacrylate as crosslinking agent.

The crosslinking comonomer is introduced advantageously into the reaction mixture in an amount of from 1% to 12% by weight, relative to the weight of hydrophobic monomer, or from 0.2% to 2% by weight, relative to the entirety of the reaction mixture.

The addition of the crosslinking comonomer may be carried out simultaneously or separately relative to the addition of hydrophobic monomer(s).

Accordingly, according to a first embodiment, the crosslinking comonomer may be added at the same time as the hydrophobic monomer(s). This embodiment is particularly appropriate when the crosslinking comonomer is introduced in an amount of less than 10% by weight, more particularly less than 5% by weight, relative to that of the hydrophobic monomer(s). The controlled nature of the radical polymerization allows moderation at the level of chain growth to be obtained, and hence allows the formation of crosslinking nodes in solution to be avoided before the formation of filamentous particles.

According to a second embodiment, the crosslinking comonomer may be added separately relative to the hydrophobic monomer(s). The crosslinking comonomer is preferably introduced after the step of formation of the polymer particles (a step referred to as the nucleation step). This embodiment is particularly appropriate when the crosslinking comonomer is introduced in an amount of more than 5% by weight relative to that of the hydrophobic monomer(s), more particularly of more than 10% by weight. Carrying out the addition of crosslinking comonomer separately in this way provides liberation from the formation of macrogel within the reaction mixture. It is possible, accordingly, to increase the feed rate of the crosslinking monomer and thereby to control the level of crosslinking of the particle in its core. This embodiment is particularly advantageous in that it allows the nucleation step to be dissociated from the crosslinking step, in order to obtain more effective control of the particle sizes generated during the method. By virtue of their living character, all of the polymer chains are incorporated into the microgel.

According to a second aspect, the invention pertains to filamentous particles prepared by means of the method according to the invention. These particles characteristically have a percentage of the molar mass of the hydrophilic macroinitiator in the final block copolymer of between 10% and 50%. As observed by TEM, these particles take the form of fibers with a length of greater than 10 micrometers. The filamentous particles according to the invention maintain their form and structure in a dispersed medium, independently of their concentration in the medium and/or of changes in its pH or its salinity.

In one variant embodiment, the filamentous particles are crosslinked, because they are obtained in the presence of a crosslinking comonomer. In this form as well, they retain their form and structure in a dispersed medium, independently of their concentration in the medium and/or of changes in its pH or its salinity.

The invention will now be described with the aid of the examples below, which are given by way of illustration and not of limitation.

EXAMPLES

Example 1

Preparation of the Poly(methacrylic Acid-co-sodium Styrenesulfonate) macroinitiator Example 1 illustrates the preparation of a living poly(methacrylic acid-co-sodium styrenesulfonate) copolymer, used as macroinitiator, control agent, and stabilizer for the implementation of the method of the invention.

To this end, a mixture containing 75.2 g of methacrylic acid (2.0 mol·L$^{-1}$, 17.32 g of sodium styrenesulfonate (0.18 mol·L$^{-1}$ or $f_{0,SS}$=0.087) and 398 g of DMSO is degassed at room temperature by sparging with nitrogen. Then 3.782 g (2.27×10$^{-2}$ mol·L$^{-1}$) of the alkoxyamine BlocBuilder®-MA (N-(2-methylpropyl)-N-(1-diethylphosphono-2,2-dimethylpropyl)-O-(2-carboxylprop-2-yl)hydroxylamine) are added.

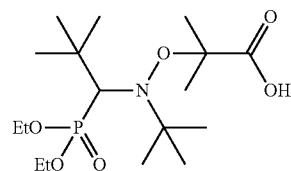 [SMILES: CCOP(=O)(OCC)C(N(OC(C)(C)C(=O)O)C(C)(C)C)C(C)(C)C]

Diagram of the BlocBuilder®-MA Initiator

Degassing is continued for 10 minutes. The degassed mixture is introduced into a 1 L three-neck flask preheated to 75° C. and surmounted by a condenser equipped with a sparger, a nitrogen inlet, and a thermometer. Polymerization is performed at 76° C. and the time t is set to 0 when the temperature reaches 35° C. in the reaction mixture. The resulting macroinitiator is P(MAA-co-SS)-SG$_1$. Operation is halted after 16 minutes of reaction, by immersing the mixture, with stirring, in a conical flask cooled with an ice bath. The reaction mixture is subsequently precipitated dropwise, in two stages, in a total volume of 4.5 liters of cooled dichloromethane subjected to vigorous stirring. A white precipitate appears in the mixture. The mixture is filtered on a grade 4 porosity flit and then dried for 3 days under vacuum.

Samples are taken at the beginning and end times for the purpose of:
 determining the polymerization kinetics (determining the molar conversion and mass conversion by $^1$H NMR (DMSO d$_6$, 300 MHz);
 monitoring the change in the number-average molar masses (Mn) as a function of the monomer conversion.

Table 1 below presents the characteristics of the synthesized macroinitiator after purification.

TABLE 1

| Time (min) | Conversion (%) | $M_n$,[a] experimental (g·mol$^{-1}$) | $M_n$,[b] theoretical (g·mol$^{-1}$) | $I_p$ | $M_n$,[c] experimental (g·mol$^{-1}$) |
|---|---|---|---|---|---|
| 16 | 10 | 7200 | 1300 | 1.5 | 6350 |

[a] Determined by size exclusion chromatography in DMF with 1 g·L$^{-1}$ of LiBr, with calibration using polymethyl methacrylate, following methylation of the methacrylic acid units to methyl methacrylate units after purification;
[b] Calculated on the basis of methyl methacrylate units;
[c] Calculated on the basis of methacrylic acid units after purification.

The experimental $M_n$ is determined by size exclusion chromatography in DMF containing 1 g/L of LiBr, with calibration using polymethyl methacrylate, following methylation of the methacrylic acid units to methyl methacrylate units. The flow rate is 0.8 mL/min with toluene as flow rate marker. The samples are prepared at a concentration of 5 mg/mL, are filtered on 0.45 µm filters, and are analyzed on Polymer Standards Service columns (Gram from 30-1000 Å).

The polydispersity index $I_p$ is calculated on the basis of methyl methacrylate units.

The living nature of this macroinitiator is tested in a first phase by $^{31}$P NMR analysis. This characterization technique shows the presence of the phosphorus in the purified polymer.

A second, chain extension experiment is carried out in order to obtain a poly(methacrylic acid-co-sodium styrenesulfonate)-b-poly(styrene) block copolymer.

A mixture containing 61.4 mg of the purified macroinitiator P(MAA-co-SS)-SG1 (3.08×10$^{-3}$ mol·L$^{-1}$), 1.314 g of styrene (3.22 mol·L$^{-1}$), and 2.7335 g of DMSO is degassed at room temperature by sparging with nitrogen for 20 minutes in a 10 mL round-bottom flask. The flask is immersed in an oil bath at 120° C. for 5.5 hours.

The resulting polymer is analyzed to:
determine the conversion of the polymerization (determined by gravimetry);
monitor the value of the number-average molar mass ($M_n$) as a function of monomer conversion.

Table 2 below presents the characteristics of the P(MAA-co-SS)-b-P(Sty) polymer synthesized.

TABLE 2

| Time (h) | Conversion (%) | $M_n$, Experimental (g·mol$^{-1}$) | $M_n$, Theoretical (g·mol$^{-1}$) | $I_p$ |
|---|---|---|---|---|
| 5.5 | 38 | 58 350 | 65 750 | 1.44 |

The experimental $M_n$ is determined by size exclusion chromatography in DMF containing 1 g·L$^{-1}$ of LiBr, with calibration using polymethyl methacrylate, following methylation of the methacrylic acid units to methyl methacrylate units.

Comparative Example 2

Method for Obtaining Spherical Micelles

Example 2 illustrates the synthesis of particles in forms of spherical micelles of poly(sodium methacrylate-co-sodium styrenesulfonate)-b-poly(methyl methacrylate-co-styrene) block copolymers from the macroinitiator prepared and isolated in example 1. A 250 mL single-neck round-bottom flask is charged with 41.5 g of deionized water, 4.1 g of P(MAA-co-SS)-SG$_1$ macroinitiator (8.14×10$^{-3}$ mol·L$^{-1}$$_{water}$) prepared in example 1, 37.8 g of 1M aqueous sodium hydroxide (1 equivalent relative to the methacrylic acid units), and 0.29 g of Na$_2$CO$_3$ (3.46×10$^{-2}$ mol·L$^{-1}$). This mixture is stirred at room temperature, for approximately 15 minutes, until dissolution of the macroinitiator is complete, the latter then being in the poly(sodium methacrylate-co-sodium styrenesulfonate) form. Then 18.2 g of methyl methacrylate and 1.9 g of styrene are added (solids content=19.2%) and the mixture is degassed by sparging with nitrogen at room temperature for 30 minutes.

The mixture is introduced into a hot reactor under a pressure of 3 bar of nitrogen and with stirring at 250 rpm. The time t is set to 0 at 60° C. and the reactor is held at 90° C. throughout the polymerization. Samples are taken at regular intervals in order:
to determine the kinetics of polymerization by gravimetry (measurement of dry matter);
to monitor the change in number-average molar masses ($M_n$) with monomer conversion;
to evaluate the colloidal characteristics of the latex (by Transmission Electron Microscopy (TEM) and by light scattering: average diameter of the particles, size distribution of the particles (polydispersity)).

Table 3 below presents the characteristics of the sampled latexes.

The latex obtained at the end of polymerization is transparent and of very low viscosity.

The appearance of the particles is analyzed by transmission electron microscopy. This microscope is a JEOL 100 Cx II at 100 keV, equipped with an SIS Keen View high-resolution CCD camera. The image obtained is shown in appended FIG. 1 (67.2% conversion by mass, with a hydrophilic fraction of 23.4% by weight).

TABLE 3

| Time (h) | Conversion (%) | $M_n$, exp[a] g·mol$^{-1}$ | $M_n$, theo[b] g·mol$^{-1}$ | $I_p$[a] | pH | Dz[c] (nm) | Σ[d] |
|---|---|---|---|---|---|---|---|
| 0.25 | 17.6 | 19 700 | 12 700 | 1.27 | — | — | — |
| 0.5 | 26.9 | 23 150 | 15 570 | 1.37 | 7 | — | — |
| 0.75 | 37.6 | 31 700 | 18 900 | 1.2 | — | — | — |
| 1 | 56.2 | 35 960 | 24 700 | 1.23 | — | — | — |
| 2.9 | 67.2 | 40 500 | 28 000 | 1.29 | 6.85 | 36.8 | 0.16 |

[a] Determined by size exclusion chromatography in DMF with 1 g·L$^{-1}$ of LiBr, with calibration using polymethyl methacrylate, following methylation of the methacrylic acid units to methyl methacrylate units;
[b] Calculated on the basis of methyl methacrylate units;
[c] Intensity-average diameter of the particles;
[d] Polydispersity of the latexes.

Example 3

Method for Obtaining Filamentous Particles According to the Invention

Example 3 illustrates the synthesis of filamentous particles of poly(sodium methacrylate-co-sodium styrenesulfonate)-b-poly(methyl methacrylate-co-styrene) block copolymers from the macroinitiator prepared and purified in example 1.

A 250 mL single-neck round-bottom flask is charged with 55.7 g of deionized water, 2.29 g of P(MAA-co-SS)-SG1 macroinitiator (4.54×10$^{-3}$ mol·L$^{-1}$$_{water}$) prepared in example 1, 23.7 g of 1M aqueous sodium hydroxide (1 equivalent relative to the methacrylic acid units), and 0.295 g of Na$_2$CO$_3$ (3.5×10$^{-2}$ mol·L$^{-1}$). This mixture is stirred at room temperature, for approximately 15 minutes, until dissolution of the macroinitiator is complete, the latter then being in the poly(sodium methacrylate-co-sodium styrenesulfonate) form. Then 18.2 g of methyl methacrylate and 1.8 g of styrene are added (solids content=19.5%) and the mixture is degassed by sparging with nitrogen at room temperature for 30 minutes.

The mixture is then introduced into a Parr® reactor, series 5100, equipped with a 300 mL single-jacket glass tank with an internal diameter of 63 mm and a useful height of 102 mm. Stirring is maintained by a magnetic-drive stirrer fitted with a turbine, at 250 rpm. The tank of the reactor is heated beforehand.

The mixture is introduced into the hot reactor under a pressure of 3 bar of nitrogen and the time t is set at 0 at 60° C. and is maintained at 90° C. throughout the polymerization. Samples are taken at regular intervals in order:
- to determine the kinetics of polymerization by gravimetry (measurement of dry matter);
- to monitor the change in the number-average molar masses ($M_n$) with monomer conversion;
- to evaluate the colloidal characteristics of the latex (by TEM).

Table 4 below presents the characteristics of the sampled latexes.

TABLE 4

| Time (h) | Conversion (%) | $M_n$, exp[a] g · mol$^{-1}$ | $M_n$, theo[b] g · mol$^{-1}$ | $I_p$[a] | pH |
|---|---|---|---|---|---|
| 0.25 | 18 | 23 900 | 17 200 | 1.3 | 7.9 |
| 0.5 | 25.5 | 31 600 | 21 350 | 1.24 | — |
| 0.75 | 43.6 | 42 850 | 31 400 | 1.13 | 7.55 |
| 1 | 52 | 46 700 | 36 000 | 1.13 | — |
| 3.1 | 68 | 53 700 | 44 900 | 1.2 | 6.7 |

[a]Determined by size exclusion chromatography in DMF with 1 g · L$^{-1}$ of LiBr, followed with calibration using polymethyl methacrylate, following methylation of the methacrylic acid units to methyl methacrylate units;
[b]Calculated on the basis of methyl methacrylate units.

The latex obtained at the end of polymerization is white and highly viscous.

Figure 2:
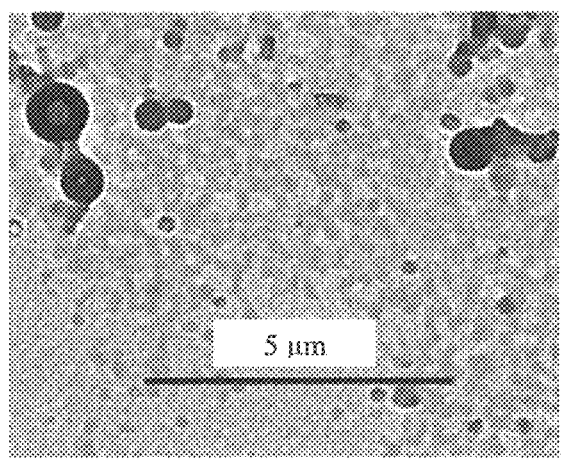
FIG. 2 corresponds to the TEM image of filamentous particles according to the invention, for a degree of conversion by mass of 25.5% and a proportion of hydrophilic fraction of 31% by weight.
Figure 3:
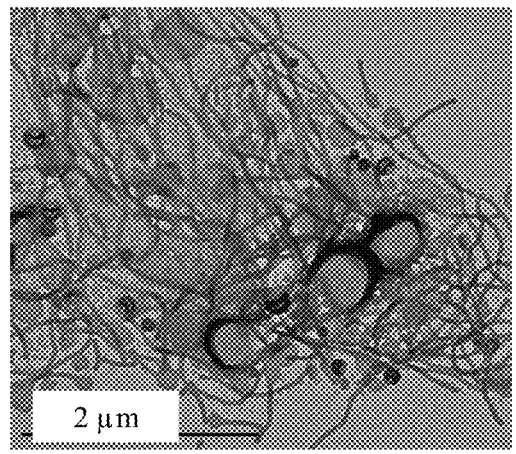
FIG. 3 corresponds to the TEM image of filamentous particles according to the invention, for a degree of conversion by mass of 52% and a proportion of hydrophilic fraction of 18% by weight.
Figure 4:
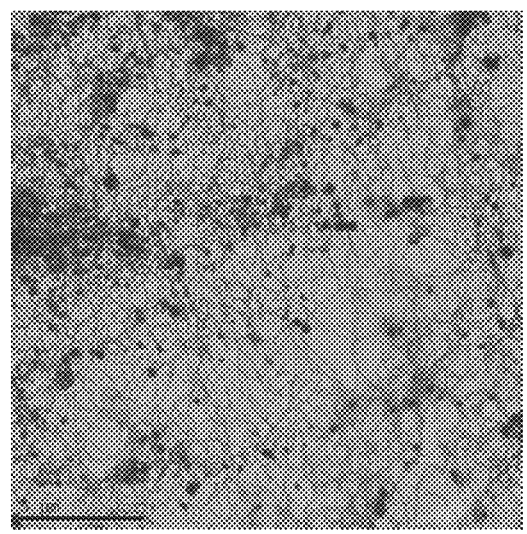
FIG. 4 corresponds to the TEM image of filamentous particles according to the invention, for a degree of conversion by mass of 68% and a proportion of hydrophilic fraction of 14.4% by weight.

The appearance of the particles is analyzed by transmission electron microscopy (TEM). This microscope is a JEOL 100 Cx II microscope at 100 keV, equipped with an SIS Keen View high-resolution CCD camera. The images obtained are shown in FIGS. 2, 3, and 4, as indicated below:
- FIG. 2 corresponds to 25.5% conversion by mass, with a hydrophilic fraction of 31% by weight;
- FIG. 3 corresponds to 52% conversion by mass, with a hydrophilic fraction of 18% by weight;
- FIG. 4 corresponds to 68% conversion by mass, with a hydrophilic fraction of 14.4% by weight.

Inventive Example 4

Method for Obtaining Crosslinked Filamentous Particles

Example 4 illustrates the synthesis of filamentous particles containing crosslinker, of poly(sodium methacrylate-co-sodium styrenesulfonate)-b-poly(methyl methacrylate-co-styrene-co-divinylbenzene) block copolymers from the macroinitiator prepared and purified in example 1.

A 250 mL single-neck round-bottom flask is charged with 57 g of deionized water, 2.63 g of P(MAA-co-SS)-SG$_1$ macroinitiator (5.22×10$^{-3}$ mol·L$^{-1}$$_{water}$) prepared in example 1, 24.2 g of 1M aqueous sodium hydroxide (1 equivalent relative to the methacrylic acid units), and 0.296 g of Na$_2$CO$_3$ (3.45×10$^{-2}$ mol·L$^{-1}$). This mixture is stirred at room temperature, for approximately 15 minutes, until dissolution of the macroinitiator is complete, the latter then being in the poly(sodium methacrylate-co-sodium styrenesulfonate) form. Then 18.1 g of methyl methacrylate and 0.784 g of styrene ($f_{0,S}$=0.04 mol; $f_{0,S}$=$n_{Sty}/(n_{sty}+n_{MMA})$) are added and the mixture is degassed by sparging with nitrogen at room temperature for 30 minutes.

The mixture is introduced into a hot reactor (same configuration as in example 2) under a pressure of 3 bar of nitrogen and with stirring at 250 rpm. The time t is set to 0 at 60° C. and the reactor is maintained at 90° C. throughout the polymerization.

After 50 minutes, 0.982 g of divinylbenzene ($f_{0,DVP}$=0.04 mol) ($f_{0,DVP}$=$n_{DVP}/(n_{DVP}+n_{MMA})$) (solids content=19%) is introduced into the mixture to crosslink the fibers after they have been formed.

Samples are taken at regular intervals in order:
- to determine the kinetics of polymerization by gravimetry (measurement of dry matter);
- to monitor the change in the number-average molar masses (Mn) with monomer conversion.

Table 5 below presents the characteristics of the sampled latexes.

TABLE 5

| Time (h) | Conversion (%) | $M_n$, exp[a] g · mol$^{-1}$ | $M_n$, theo[b] g · mol$^{-1}$ | $I_p$[a] | pH |
|---|---|---|---|---|---|
| 0.25 | 19 | — | 15 700 | — | 7.8 |
| 0.5 | 26 | — | 18 800 | — | — |
| 0.75 | 45 | — | 27 300 | — | — |
| 1 | 52 | — | 31 600 | — | — |
| 3 | 65 | — | 37 700 | — | — |

[a]Determined by size exclusion chromatography in DMF with 1 g · L$^{-1}$ of LiBr, followed with calibration using polymethyl methacrylate, following methylation of the methacrylic acid units to methyl methacrylate units;
[b]Calculated on the basis of methyl methacrylate units.

The latex obtained at the end of polymerization is in the form of a gel. The crosslinker is added during polymerization in order to allow the self-assembly of the particles prior to crosslinking of the micelles in forms of elongated micelles.

Figure 5:
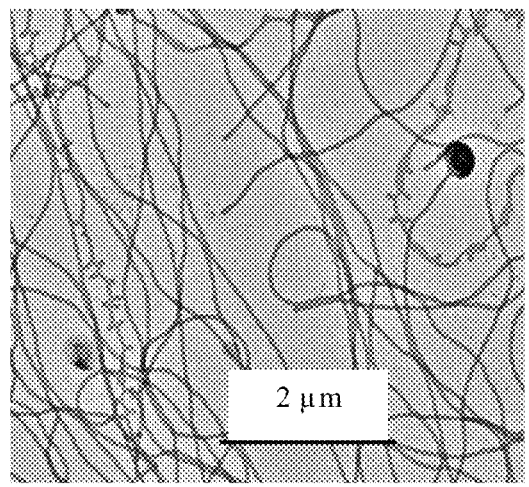
FIG. 5 illustrates the crosslinked filamentous particles according to the invention, for a degree of conversion by mass of 68% and a proportion of hydrophilic fraction of 14.4% by weight, as observed in TEM.

The images obtained are presented in FIG. 5 which corresponds to 68% conversion by mass with a hydrophilic fraction of 14.4% by weight.

Example 5

Figure 6:
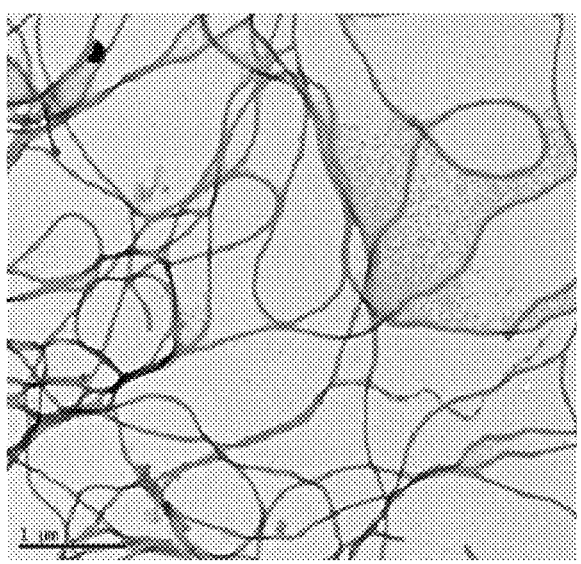
FIG. 6 corresponds to the TEM image of filamentous particles prepared in a 0.2% by weight solution and dialyzed for 4 days against ultrapure water.

Study of the Behavior of the Filamentous Particles According to the Invention in Dispersed Medium, with Variation of pH and Salinity Filamentous particles prepared in an aqueous solution at 0.2% by weight are dialyzed for 4 days against ultrapure water. FIG. 6 corresponds to the TEM image of dialyzed filamentous particles.

Figure 7:
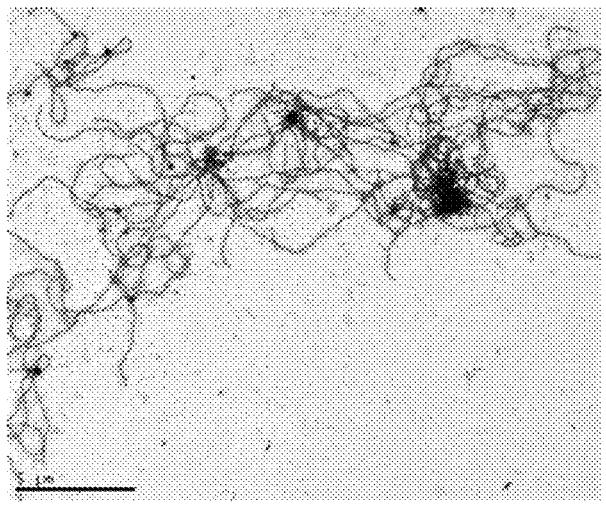
FIG. 7 corresponds to the TEM image of these filamentous particles after centrifuging.

Filamentous particles prepared in an aqueous solution at 0.2% by weight are centrifuged for 1 hour at 2100 rpm and at 10° C. The sediment (or centrifuging pellet) obtained is diluted in an aqueous solution. FIG. 7 corresponds to the TEM image of these particles after centrifuging.

Figure 8:
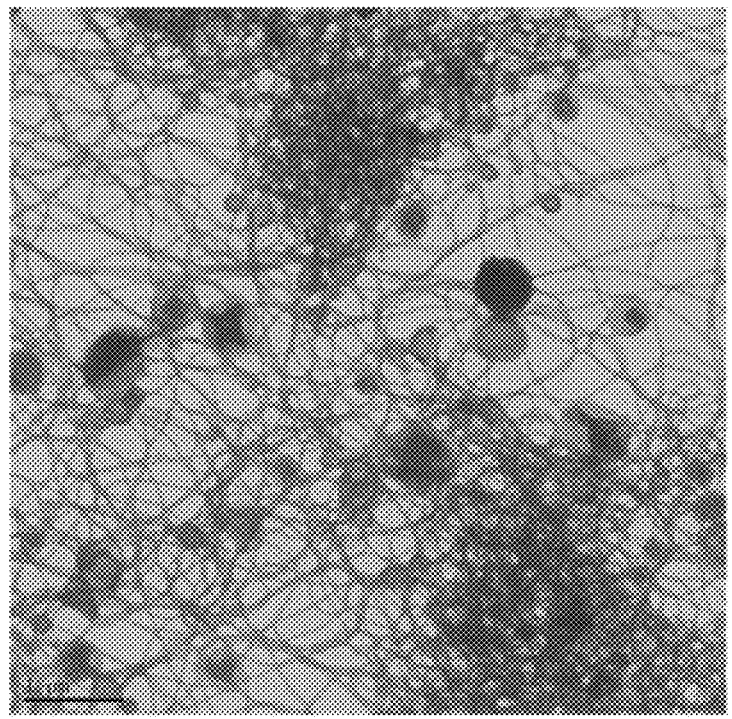
FIG. 8 corresponds to the TEM image of filamentous particles diluted in a solution at pH 5.

FIG. 8 corresponds to the TEM image of filamentous particles diluted in a solution at pH 5.

Figure 9:
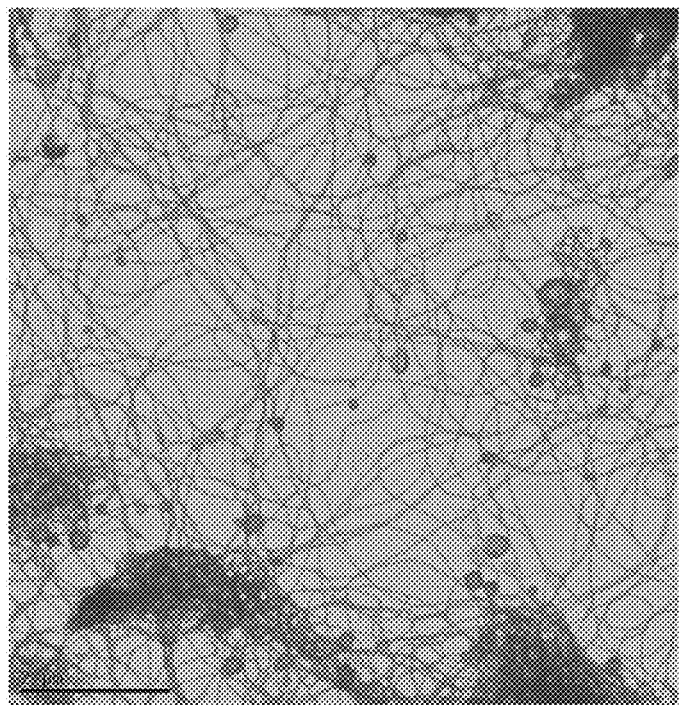
FIG. 9 corresponds to the TEM image of filamentous particles diluted in an aqueous solution containing 35 g of salt (NaCl) per 1 kg of water.

FIG. 9 corresponds to the TEM image of filamentous particles diluted in an aqueous solution containing 35 grams of salt (NaCl) per 1 kg of water.

These results show that the filamentous particles according to the invention maintain their shape and structure in dispersed medium, independently of their concentration in the medium, of the dialysis of the particles (FIG. 6), of the centrifuging of the mixture (FIG. 7) and/or of variations in its pH (FIG. 8) or its salinity (FIG. 9).

Example 6

Preparation of the Poly(methacrylic Acid-co-sodium Styrenesulfonate) macroinitiator In situ for the Method for Obtaining Spherical Micelles in a Single Step This example illustrates the preparation of a living poly (methacrylic acid-co-sodium styrenesulfonate) copolymer, used as a macroinitiator, control agent, and stabilizer, in the initial charge, for the synthesis of hairlike nanoparticles in forms of spherical micelles of poly(sodium methacrylate-co-sodium styrenesulfonate)-b-poly(methyl methacrylate-co-styrene) block copolymers. The amphiphilic copolymer is synthesized in a single step. The conditions of synthesis of the macroinitiator can be varied (polymerization time, amount of sodium styrenesulfonate, concentration, and pH) in order to adapt and vary the composition of the macroinitiator.

For this purpose, a mixture containing 15.3 mg of SG1 ($1.27 \times 10^{-3}$ mol·L$^{-1}$), 4.212 g of methacrylic acid (2.05 mol·L$^{-1}$), 0.93 g of sodium styrenesulfonate (0.15 mol·L$^{-1}$ or $f_{0,SS}=0.07$; $f_{0,SS}=n_{SS}/(n_{ss}+n_{MAA})$), and 19.5 g of ultrapure water is degassed at room temperature by sparging with nitrogen for 20 minutes.

Then 0.18 g ($2.08 \times 10^{-2}$ mol·L$^{-1}$) of the BlocBuilder®-MA alkoxyamine is added.

(a)

(b)

Scheme of the BlocBuilder®-MA Initiator (a) and of the SG1 Nitroxide (b)

Degassing is continued for 10 minutes. The mixture is introduced into a hot reactor under a pressure of 1 bar of nitrogen and with stirring at 250 rpm. The time t is set to 0 on immersion and the reactor is maintained at around 70° C. for 15 minutes.

During this reaction, a round-bottom flask is charged with 20.8 g of 1 M aqueous sodium hydroxide (1 equivalent relative to the methacrylic acid units) and 0.1615 g of Na$_2$CO$_3$ ($3.8 \times 10^{-2}$ mol·L$^{-1}$), and then 9.19 g of methyl methacrylate and 0.92 g of styrene are added (solids content=18%) and the mixture is degassed by sparging with nitrogen at room temperature for 20 minutes.

After 15 minutes of synthesis—that is, the synthesis of the poly(methacrylic acid-co-sodium styrenesulfonate)-SG1 macroinitiator, the second reaction mixture, containing the hydrophobic monomers, is introduced at ambient pressure and then a pressure of 3 bar of nitrogen with stirring at 250 rpm. The time t is set to 0 at 60° C. in the reaction mixture and the reactor is maintained at 95° C. throughout the polymerization. Samples are taken at regular intervals in order:

- to determine the kinetics of polymerization by gravimetry (measurement of dry matter);
- to monitor the change in the number-average molar masses (Mn) with monomer conversion;
- to evaluate the colloidal characteristics of the latex by light scattering: average particle diameter, particle size distribution (polydispersity)).

Table 6 below presents the characteristics of the sampled latexes from the second step of the synthesis of the nanoparticles.

TABLE 6

| Time (h) | Conversion (%) | $M_n$, exp$^a$ g·mol$^{-1}$ | $M_n$, theo$^b$ g·mol$^{-1}$ | $I_p{}^a$ | pH | Dz$^c$ (nm) | $\Sigma^d$ |
|---|---|---|---|---|---|---|---|
| 0.25 | 24 | 23 950 | 22 000 | 1.47 | 4.5-5 | — | — |
| 0.5 | 33.4 | 33 200 | 27 250 | 1.35 | 4.5-6 | — | — |
| 2.25 | 52.3 | 41 000 | 37 900 | 1.3 | — | — | — |
| 3 | 55.3 | 41 000 | 39 600 | 1.34 | — | 27.5 | 0.15 |

$^a$Determined by size exclusion chromatography in DMF with 1 g·L$^{-1}$ of LiBr, with calibration using polymethyl methacrylate, following methylation of the methacrylic acid units to methyl methacrylate units;
$^b$Calculated on the basis of a theoretical evaluation of the molar mass of the macroinitiator synthesized in situ, i.e., Mn = 8500 g/mol as equivalent of methyl methacrylate units;
$^c$Intensity-average diameter of the particles;
$^d$Polydispersity of the latexes.

The latex obtained at the end of polymerization is translucent and has a very low viscosity.

The experimental $M_n$ is determined by size exclusion chromatography in DMF containing 1 g/l of LiBr, with calibration using polymethyl methacrylate, following methylation of the methacrylic acid units to methyl methacrylate units. The flow rate is at 0.8 ml/min with toluene as flow rate marker. The samples are prepared at a concentration of 5 mg/ml, are filtered on 0.45 μm filters, and are analyzed on Polymer Standards Service columns (Gram from 30-1000 Å).

The polydispersity index $I_p$ is calculated on the basis of methyl methacrylate units.

Abbreviations:
CRP—controlled radical polymerization
P4VP—poly(4-vinylpyridine)
PNaA—poly(sodium acrylate)
SG1—N-tert-butyl-N-[1-diethylphosphono(2,2-dimethylpropyl)]
S or sty—styrene
SS—sodium styrenesulfonate
AA—acrylic acid
PEGA—poly(ethylene glycol) methyl ether acrylate
TEM—transmission electron microscopy
RAFT—polymerization by addition fragmentation (Reversible Addition Fragmentation chain Transfer)
MAA—methacrylic acid
DMSO-dimethyl sulfoxide
DMF—dimethylformamide rpm—revolutions per minute
$f_{0,Sty}$—initial molar fraction of styrene in the mixture of monomers
$f_{0,SS}$—initial molar fraction of styrenesulfonate in the mixture of monomers
$f_{0,DVB}$—initial molar fraction of divinylbenzene in the mixture of monomers
BlocBuilder®-MA—(N-(2-methylpropyl)-N-(1-diethylphosphono-2,2-dimethylpropyl)-O-(2-carboxylprop-2-yl) hydroxylamine

The invention claimed is:

1. A method for preparing filamentous particles, said particles consisting of block copolymers, comprising the step of synthesizing by controlled radical emulsion polymerization at least one hydrophobic monomer in the presence of a living macroinitiator derived from a nitroxide, at a reaction temperature of 60 to 120° C., resulting in filamentous particles, wherein:
said macroinitiator is water-soluble and comprises a hydrophilic moiety, wherein the mass fraction of the hydrophilic moiety constituting the final block copolymer is less than 25%,
the mass percent of the water-soluble macroinitiator in the final block copolymer is between 10% and 50%, and
the degree of conversion by mass of the hydrophobic monomer is at least 50% and wherein said filamentous particles have a length of at least 10 microns.

2. The method as claimed in claim 1, wherein the hydrophobic monomer is selected from the group consisting of vinylaromatic monomers alkyl, cycloalkyl, or aryl acrylates, alkyl methacrylates, cycloalkyl methacrylates, alkenyl methacrylates, aryl methacrylates, and vinylpyridine.

3. The method as claimed in claim 1, wherein the percentage of the molar mass of the water-soluble macroinitiator in the final block copolymer is between 10% and 30%.

4. The method as claimed in claim 1, wherein the initial pH of the reaction mixture is between 5 and 10.

5. The method as claimed in claim 1, further comprising the step of admixing into the reaction mixture a crosslinking comonomer.

6. The method as claimed in claim 5, wherein the crosslinking comonomer is selected from the group consisting of divinylbenzenes, trivinylbenzenes, allyl (meth)acrylates, diallyl maleate polyol (meth)acrylates, and alkylene glycol di(meth)acrylates which have from 2 to 10 carbon atoms in the carbon chain.

7. The method as claimed in claim 1, wherein said method is a "one pot" method comprising first synthesizing said water-soluble macroinitiator in aqueous medium, and then forming said block copolymer by addition of at least one hydrophobic monomer to the same medium.

8. The method of claim 2, wherein said vinylaromatic monomers are selected from the group consisting of styrene and substituted styrenes; said alkyl, cycloalkyl, or aryl acrylates are selected from the group consisting of methyl acrylate, ethyl acrylate, butyl acrylate, 2-ethylhexyl acrylate, and phenyl acrylate; and said alkyl, cycloalkyl, alkenyl, or aryl methacrylates are selected from the group consisting of methyl methacrylate, butyl methacrylate, lauryl methacrylate, cyclohexyl methacrylate, allyl methacrylate, 2-ethylhexyl methacrylate, and phenyl methacrylate.

* * * * *